United States Patent [19]

Jansky

[11] 4,141,151
[45] Feb. 27, 1979

[54] DRILL LEVELING ARRANGEMENT

[76] Inventor: Norbert E. Jansky, 108-20th Ave. N., St. Cloud, Minn. 56301

[21] Appl. No.: 876,622

[22] Filed: Feb. 10, 1978

[51] Int. Cl.² .............................................. G01C 9/28
[52] U.S. Cl. ....................................... 33/334; 33/373
[58] Field of Search .................. 33/334, 350, 370-373, 33/379, 381, 390

[56] References Cited

U.S. PATENT DOCUMENTS

| 949,842 | 2/1910 | Pugh | 33/334 |
| 989,625 | 4/1911 | McKee | 33/334 X |
| 1,305,935 | 6/1919 | Rieker | 33/370 |
| 2,287,863 | 6/1942 | Buckley | 33/350 |
| 3,540,122 | 11/1970 | Bogdan | 33/334 X |
| 3,864,839 | 2/1975 | Wolf | 33/371 X |

FOREIGN PATENT DOCUMENTS

| 14995 | 10/1956 | Fed. Rep. of Germany | 33/370 |
| 1060733 | 3/1967 | United Kingdom | 33/390 |

*Primary Examiner*—Charles E. Phillips
*Attorney, Agent, or Firm*—Merchant, Gould, Smith, Edell, Welter & Schmidt

[57] ABSTRACT

A leveling device for use in combination with a power tool such as a portable electric drill. The leveling device comprises a pair of levels mounted so that one of the levels indicates deviation from the horizontal of a first datum plane and so that the other level indicates deviation from the horizontal of a second datum plane perpendicular to the first datum plane. The leveling device is mounted on or incorporated into the power tool so that one of the levels indicates deviation of the working axis from the horizontal and so that the other level indicates deviation of the working axis from the vertical.

3 Claims, 7 Drawing Figures

DRILL LEVELING ARRANGEMENT

BACKGROUND OF THE INVENTION

This invention relates to the general field of mechanical tools. More particularly, this invention relates to a leveling device for use in conjunction with a portable power tool.

It is often important in the use of power tools, such as electric drills, that the working or drill axis be properly aligned horizontally or vertically. Usually, visual alignment is insufficient and inaccurate for this purpose. However, the employment of a separate leveling device, such as a carpenter's level, to properly align the working axis is usually extremely cumbersome. Also, the use of a separate level is inconvenient where it is required that both hands be employed to operate the power tool.

SUMMARY OF THE INVENTION

The invention comprises an improved leveling device for incorporation into or use as an accessory to a power tool having a working axis. The leveling device generally comprises a plurality of bubble levels and means for mounting one of the levels so as to indicate deviation from the horizontal of a first datum plane and one of the levels so as to indicate deviation from the horizontal of a second datum plane perpendicular to the first datum plane. The leveling device is associated with the power tool so that one of the levels indicates deviation of the working axis from the horizontal and so that the other level indicates deviation of the working axis from the vertical.

Various advantages and features of novelty which characterize my invention are pointed out with particularity in the claims annexed hereto and forming a part hereof. However, for a better understanding of the invention, its advantages, and objects attained by its use, reference should be had to the drawing which forms a further part hereof, and to the accompanying descriptive matter, in which there is illustrated and described a preferred embodiment of the invention.

DETAILED DESCRIPTION OF THE PREFERRED EMBODIMENT

Figure 1:
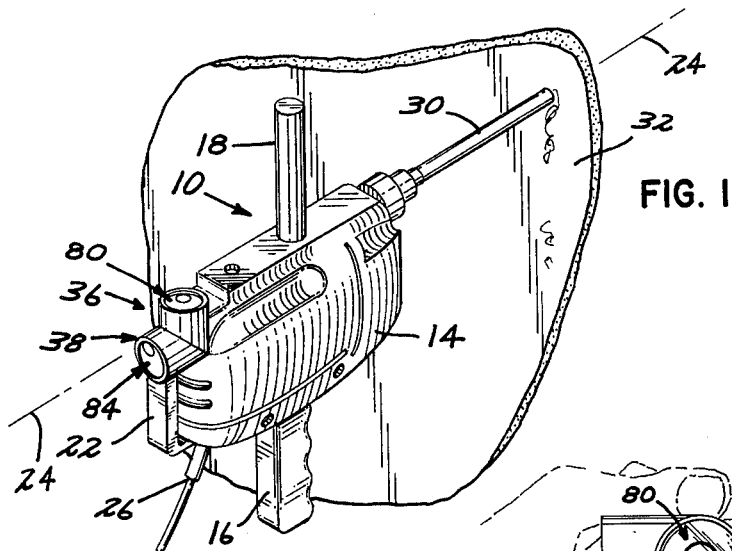
FIG. 1 is a perspective view of a portable electric drill horizontally oriented and having incorporated therein a first embodiment of the invention.

Referring now to the drawing, FIG. 1 shows a power tool such as a portable electric drill 10 which has a main drill casing 14, a bottom finger grip handle 16, a top cylindrical handle 18, and a U-shaped rear handle 22. The working axis of drill 10 is indicated at 24. Drill 10 also has an electric cord 26 and a drill bit 30 which rotates about axis 24.

Figure 4:
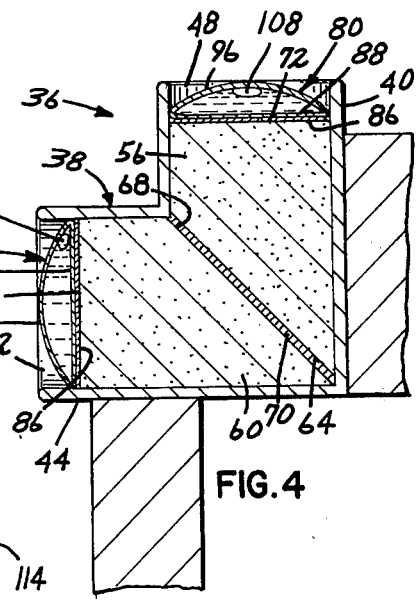
FIG. 4 is a fragmentary sectional view taken along line 4—4 of FIG. 2.

Incorporated in the handle 22 is a leveling device 36 which is more fully shown in FIG. 4. A portion of handle 22 has been replaced by the housing 38 of leveling device 36, which is integral with casing 14. Leveling device 36 has the configuration of two hollow cylindrical members 40, 44 joined at right angles to form a right angle elbow. The cylindrical members have circular open ends 48, 52 respectively which define mutually perpendicular planes. This right angle elbow is positioned in handle 22 so that the longitudinal axis of cylindrical member 44 is aligned with drill axis 24.

Leveling device 36 further includes a pair of cylindrical plugs 56, 60 which are made out of a suitable resilient material such as cork. The plugs have beveled ends 64, 68 respectively, and are positioned within the cylindrical members so that the beveled ends are in planar contact and are secured to each other by suitable means such as cement 70. The plugs have circular planar free ends 72, 76 respectively, which are displaced parallel to and within the planes defined by the open ends of the cylindrical members.

Leveling device 36 further includes a pair of circular bubble levels 80, 84. The bubble levels have planar circular bases 88, 92 respectively, which are secured to the free ends of the plugs by suitable means such as cement 86 so as to define mutually perpendicular planes. The bubble levels also have curved upper portions 96, 100 respectively, the outermost parts of the upper portions being generally tangential with respect to the planes defined by the respective open ends of the cylindrical members.

Figure 2:
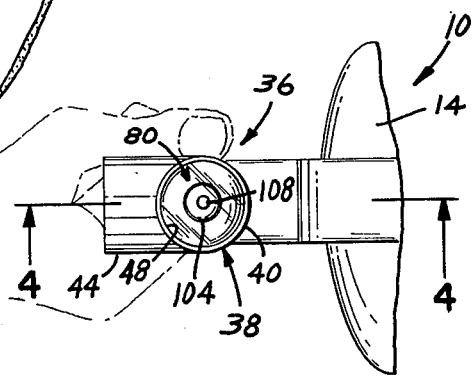
FIG. 2 is a fragmentary plan top view of the structure of FIG. 1.
Figure 3:
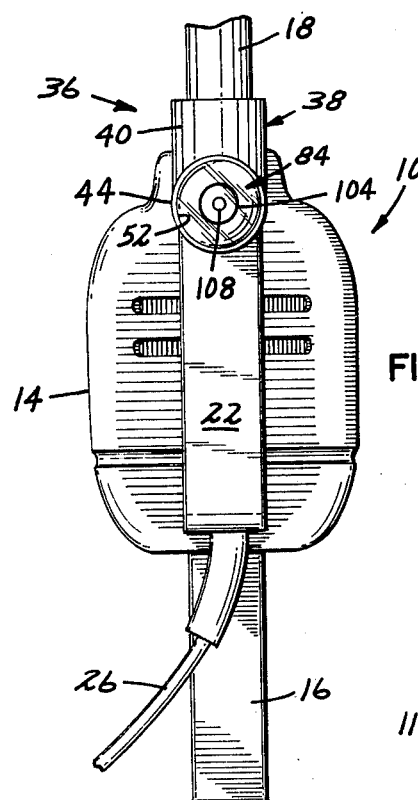
FIG. 3 is an end view of the structure of FIG. 1 oriented along a vertical axis.

As shown in FIG. 2, each bubble level also includes a centering circle 104 slightly larger than a bubble 108 in the liquid enclosed within the level. The centering circle 104 is positioned on the uuper portion of the level and is concentric with the base of the level.

In operation, bubble level 80 is used to insure the horizontal alignment of drill axis 24 when the drill is being used to make a horizontal hole. For example, if the outer end of the drill has been raised too high above the horizontal, bubble 108 moves toward the user of the drill. If the outer end of the drill is too low, bubble 108 moves away from the user of the drill. By positioning the drill so that the bubble 108 is within the centering circle 104, the drill axis 24 becomes horizontally aligned.

In contrast, bubble level 84 is used when the drill axis is to be aligned vertically to drill a vertical hole. If the drill is tilted away from the vertical, bubble 108 will move left or right or forward or backwards out of centering circle 104. To align the drill vertically, the drill is moved until bubble 108 is once again within centering circle 104.

Figure 5:
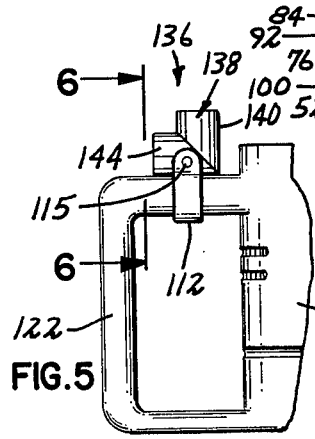
FIG. 5 shows a second embodiment of the invention in which an independent leveling device is configured for attachment to the rear handle of a portable electric drill.
Figure 6:
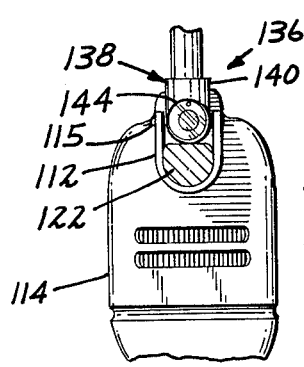
FIG. 6 is a fragmentary sectional view taken along line 6—6 of FIG. 5.
Figure 7:
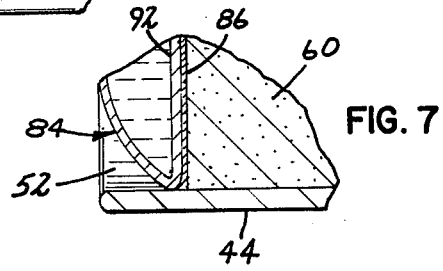
FIG. 7 is an enlarged fragmentary view of a portion of FIG. 4.

In a second embodiment of the invention for use with drill 110 is shown in FIGS. 5 and 6. In this embodiment, an independent leveling device 136 may be secured to the upper portion of unmodified drill handle 122 extending from casing 114 by means of a U-shaped bracket 112 which has a retention bolt 115 running through a housing 138 configured as an elbow, having two intersecting cylindrical members 140 and 144. As before, the longitudinal axis of cylindrical member 144 is aligned with the drill axis. The operation of leveling device 136 is the same as that detailed with respect to leveling device 36.

From the foregoing description, it can be seen that applicant has invented a new and useful device for indicating deviation of a drill axis from either horizontal or vertical alignment.

Numerous characteristics and advantages of my invention have been set forth in the foregoing description, together with details of the structure and function of the invention, and the novel features thereof are pointed out in the appended claims. The disclosure, however, is illustrative only, and changes may be made in detail especially in matters of shape, size, and arrangement of parts, within the principle of the invention, to the full extent indicated by the broad general meaning of the terms in which the appended claims are expressed.

I claim:

1. A leveling device comprising:
   an elbow having hollow cylindrical members joined to each other at right angles, said cylindrical members having circular open ends defining mutually perpendicular planes;
   a pair of resilient cylindrical plugs, one of said plugs being positioned within each of said cylindrical members, each of said plugs having a beveled end and a circular planar free end displaced from said open end of one of said cylindrical members, said beveled end of one of said plugs being in planar contact with said beveled end of the other of said plugs;
   a pair or circular bubble levels, each of said levels having a base secured to said free end of one of said plugs and a curved upper portion the outermost part of which is substantially tangential with the plane defined by said open end of one of said cylindrical members, said bases of said levels defining mutually perpendicular planes, whereby to respectively indicate deviation from the horizontal of a first datum plane and a second datum plane, said datum planes being mutually perpendicular.

2. In combination with a leveling device according to claim 1, a portable electric drill having a drill axis and means for mounting said leveling device on said drill so that one of said levels indicates deviation of said drill axis from the horizontal and said other of said levels indicates deviation of said drill axis from the vertical.

3. In an improved handle for a motor driven tool having a working axis, the improvement which comprises:
   a first hollow cylindrical member having an axis alinged with said working axis;
   a first resilient cylindrical plug within said member and having an outer end perpendicular to the axis in said member;
   means mounting said first plug within said member;
   a second hollow cylindrical member having an axis perpendicular to said working axis, said members being joined at right angles;
   a second resilient cylindrical plug having an outer end perpendicular to the axis of said second member, said outer ends of said plugs being mutually perpendicular, said plugs further including beveled ends in planar contact within said members;
   means mounting said second plug within said second chamber; and
   a second circular bubble level secured to said outer end of said second plug within said second member.

* * * * *